United States Patent [19]

Stevenson et al.

[11] 4,432,624

[45] Feb. 21, 1984

[54] DELAY TIMER FOR A CAMERA

[75] Inventors: Joan M. Stevenson, Kingston, Canada; Mark G. Pipkorn, Minneapolis, Minn.

[73] Assignee: Queen's University at Kingston, Kingston, Canada

[21] Appl. No.: 349,019

[22] Filed: Feb. 16, 1982

[51] Int. Cl.³ .......................... G03B 9/64; G03B 17/40
[52] U.S. Cl. ................................. 354/238.1; 354/266; 361/196
[58] Field of Search ............... 354/131, 238, 266, 267; 361/196

[56] References Cited

U.S. PATENT DOCUMENTS 3,686,672  8/1972  Ishizuka ........................... 354/266 X
4,323,789  4/1982  Dion ................................. 361/196 X
4,383,744  5/1983  O'Connell ........................ 354/266 X

*Primary Examiner*—Michael L. Gellner
*Attorney, Agent, or Firm*—Richard J. Hicks; Stanley E. Johnson

[57] ABSTRACT

A relatively inexpensive electronic delay timer particularly suitable for portable use in such applications as control of a camera shutter. The timer can be used in either a leading or trailing mode and employs a small 6V battery as a power source. An integrated circuit timer device is arranged to provide an output signal at the end of a time delay period which can be variably selected by means of a built-in capacitive-resistive network and which is arranged to start in response to a movement of an external control switch. The output signal triggers a second time period of predetermined duration in a second integrated circuit timer during which time a second output signal is generated thereform which is used to activate a transistor device, allowing a capacitor in the circuit to discharge therethrough and through a solenoid which is mechanically coupled to the camera shutter. When the second output signal ceases, at the end of the second time period, the transistor is deactivated and the capacitor recharges. The device is particularly adapted for use in sport coaching, professional and amateur photography and amateur naturalist pursuits.

9 Claims, 4 Drawing Figures

DELAY TIMER FOR A CAMERA

FIELD OF INVENTION

This invention relates to an electronic timer device with a mechanical output and more particularly to an inexpensive portable delay timer for use with a camera, particularly a 35 mm camera.

BACKGROUND OF THE INVENTION

Electronic delay timer devices are, of course, well known in the art, but such devices are generally relatively bulky, heavy and expensive and also require an AC power source for operation. Such devices are not, therefore, particularly suitable for mobile or portable use such as sports or nature photography. Mechanical timers for cameras are known to the art but are relatively cumbersome and lack sufficient precision to reliably and accurately time delays of as little as 0.1 seconds after triggering which are required to photographically record such events as a volleyball spike, a baseball leaving the pitcher's hand or a bird alighting on a branch.

There is, therefore, a need for a simple, accurate and inexpensive delay timer for use with a camera, particularly a camera such as that used by an amateur sports coach or amateur naturalist, as well as professional and amateur photographers.

OBJECTS OF THE INVENTION

An object of the present invention is to provide an electronic delay timer for a camera, such as a 35 mm camera.

Another object of the present invention is to provide a relatively simple and inexpensive camera delay timer combination suitable for use by an amateur photographer.

BRIEF STATEMENT OF INVENTION

By one aspect of this invention there is provided a delay timer circuit comprising:
an externally controlled switch means;
first integrated circuit timer means arranged to provide a first output signal at the end of a selected first delay period initiated by said externally controlled switch means;
variable resistor-capacitor means for selecting duration of said first delay period;
circuit means for connecting said first integrated circuit timer means, through said externally controlled switch means, to a DC power source;
second integrated circuit timer means arranged to provide a second output signal for a predetermined time period initiated by said first output signal;
transistor means activated by said second output signal;
solenoid means arranged to mechanically activate an external load when a current is passed therethrough; and
capacitor means arranged to discharge a current through said solenoid means and said transistor means when said transistor means is activated, and to charge when said transistor means is deactivated.

By another aspect of this invention there is provided a camera electronic delay timer combination comprising:
a camera having shutter means;
switch means for triggering said shutter means, remote from said camera;
first integrated circuit timer means arranged to provide a first output signal at the end of a selected first delay period initiated by operation of said switch means;
variable resistor-capacitor means for selecting duration of said first delay period;
circuit means for connecting said first integrated circuit timer means, through said switch means, to a DC power source;
second integrated circuit timer means arranged to provide a second output signal for a predetermined time period initiated by said first output signal;
transistor means activated by said second output signal;
solenoid means arranged to mechanically trigger said shutter means when a current is passed therethrough; and
capacitor means arranged to discharge a current through said solenoid means and said transistor means when said transistor means is activated and to charge when said transistor means is deactivated.

DESCRIPTION OF THE DRAWINGS

The invention will be described in more detail hereinafter with reference to the drawings in which.

DETAILED DESCRIPTION

Figure 1:
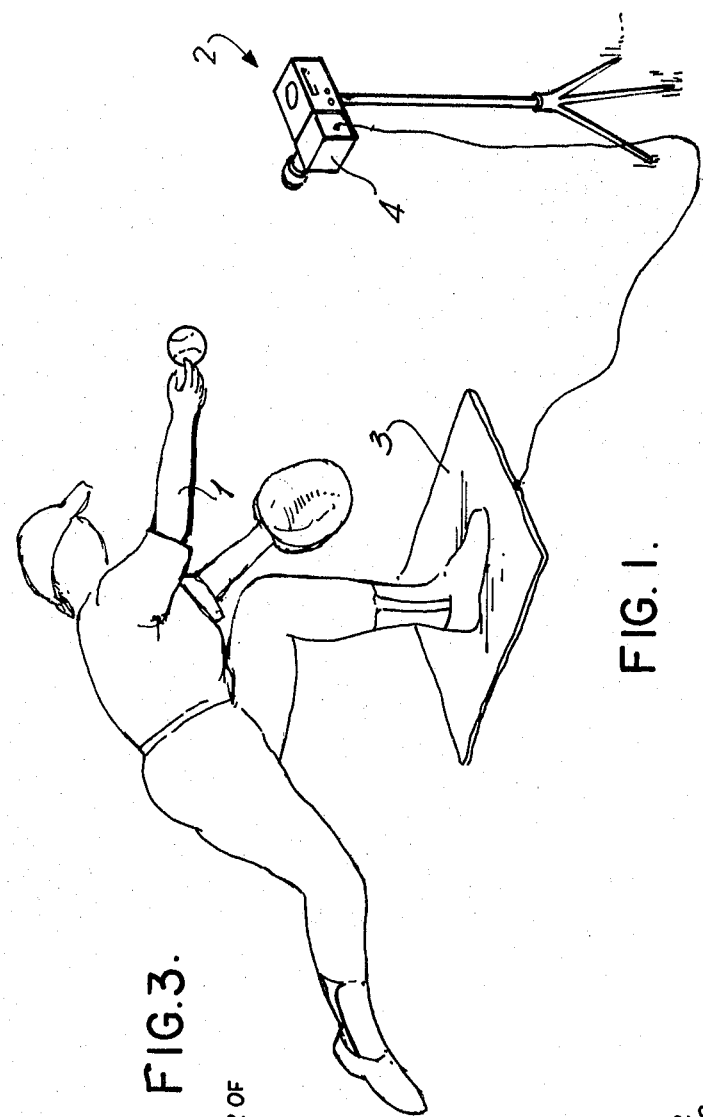
FIG. 1 is a sketch illustrating the camera and trigger arrangement of one embodiment.
Figure 3:
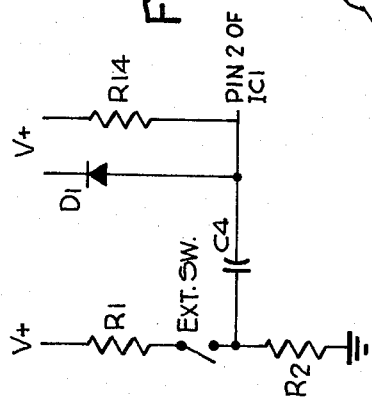
FIG. 3 is a schematic diagram of part of the circuit of FIG. 2 illustrating the trailing mode.
Figure 4:
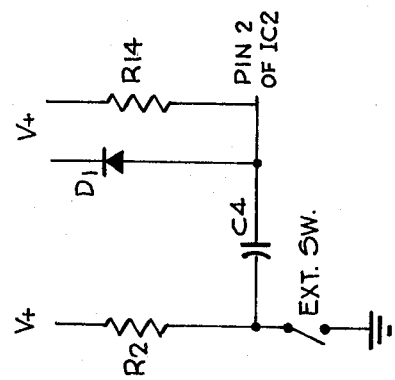
FIG. 4 is a schematic diagram of part of the circuit of FIG. 2 illustrating the leading mode.

In order to analyse a player's style it is of considerable assistance to a coach to be able to refer to a photograph of the player in action. At the professional level this is frequently done by means of a movie film sequence or a series of still photographs taken by means of a high speed advance camera. Such aids are, however, relatively costly to obtain and operate and are generally beyond the resources of amateur sports coaches. While ordinary 35 mm cameras and the like will take satisfactory pictures for coaching purposes, it is extremely difficult to time the shutter release so as to capture a particular instant in a series of continuous movements repetitively, unless some form of delay trigger mechanism is employed. While mechanical triggers, known in the art, operated by the athlete himself, may be employed they are not sufficiently reliable or accurate to provide the desired time delay which may be as little as 0.01 of a second. For example, as shown in FIG. 1, it may be desired to record the exact instant of release of a baseball from the hand of a pitcher 1, and in order to do this the pitcher triggers the camera 2 by stepping on a mat 3, containing a trigger switch and operatively connected via a delay timer 4 to camera 2, as he advances to make his pitch. It is relatively easy, by trial and error, to determine the time delay between stepping on the mat 3 and release of the ball, and experiments have shown that the time delay is remarkably constant from pitch to pitch. It is then a relatively simple operation to adjust the time delay of the timer to actuate the camera shutter so as to capture the desired instant consistently and repeatedly for a series of pitches. A typical delay timer designed to achieve this result is illustrated schematically in FIG. 2, and which is designed to operate in either a trialing or leading mode. The mode of operation is selected by the position of the double pole double throw switch SW1. In the trailing mode, the delay period begins when an external, normally open° switch EXT SW connected at the two terminals of jack JK1, is re-opened following a closure. In the leading mode, the delay period begins when the switch EXT SW is first closed. The circuitry of the trailing and leading mode arrangements is shown in more detail in FIGS. 3 and 4 respectively.

Trailing mode is selected by placing SW1 so that terminal SW1a is connected to terminal SW1b and TERMINAL SW1f is connected to terminal SW1e. When the external switch ETX.SW. has been open for a long period of time, the voltage across capacitor C4 and the voltage at point 2 will be equal to the positive direct current supply voltage. When the external switch EXT. SW. is initially closed, resistors R1 and R2 form a voltage divider at one end of capacitor C4. Capacitor C4 partially discharges through diode D1 and resistors R1, R2 and R14. Diode D1 prevents the voltage at point 2 from reaching a potential greater than one diode forward voltage drop above the positive direct current supply voltage, protecting the following delay circuitry. When the external switch EXT.SW. is subsequently opened, the voltage at point 2 momentarily falls below the trigger threshold of the delay circuit. The voltage reached is determined by the actual values of R1, R2 and R14, and may be evacuated by one skilled in the art. The sole purpose of resistor R1 is to limit current in case of an accidental grounding of the trigger switch connections.

Leading mode is selected by placing SW1 so that terminal SW1b is connected to terminal SW1c and terminal SW1e is connected to terminal SW1d. When the external switch EXT.SW. has been open for a long period of time, the voltage across capacitor C4 is zero volts and the voltage at point 2 will be equal to the positive direct current supply voltage. When the external switch EXT.SW. is closed, the voltage at point 2 momentarily falls below the trigger threshold of the delay circuit. When the external switch EXT.SW. is subsequently opened, diode D1 prevents the voltage at point 2 from reaching a potential greater than one diode forward voltage drop above the positive direct current supply voltage.

Figure 2:
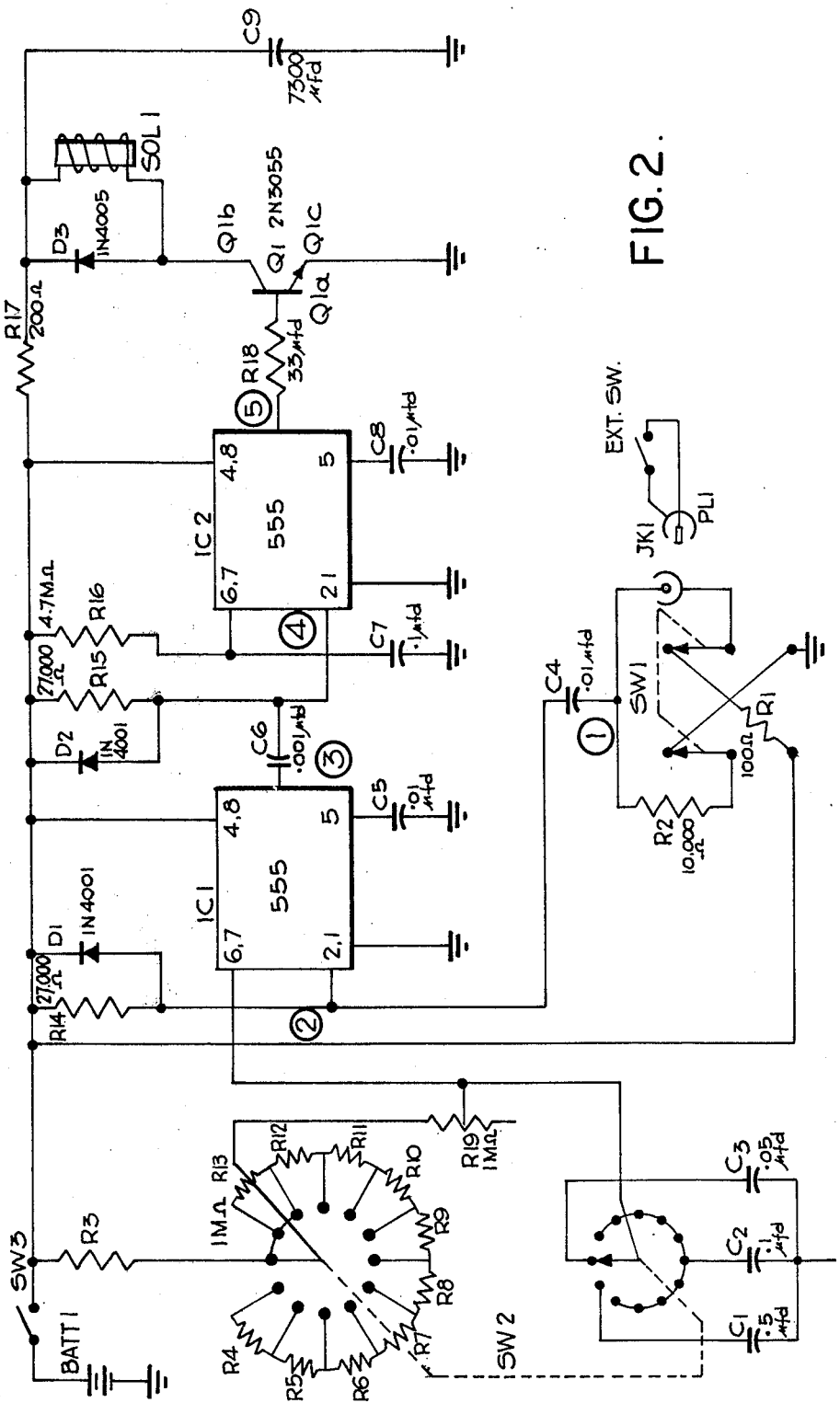
FIG. 2 is a schematic diagram of the delay timer circuit.

As can be seen in FIG. 2, resistors R3 to R13, R19, capacitors C1, C2 and C3, and rotary switch SW2 are connected as a variable resistive-capacitive network for the setting of the timing period of integrated circuit IC1, generally a 555 timer. Resistor R1 and capacitor C7 set the timing period for integrated circuit IC2, also generally a 555 timer.

When the voltage at point 2 drops below the trigger threshold of the 555 timer IC1, as described above for both modes of operation, the integrated circuit output at point 3 changes from zero volts to the positive direct current supply voltage. Since capacitor C6 is initially charged to the positive direct current supply voltage through resistor R15, raising the voltage at point 3 raises the voltage at point 4 above the positive direct current supply voltage. To protect the input to 555 timer IC2, diode D2 constrains the voltage at point 4 to one diode forward voltage drop above the positive direct current power supply rail. At the end of its timing period, the voltage at point 3, which is the output of the 555 timer IC1, returns to zero volts. This causes the voltage at point 4 to momentarily fall below the trigger threshold of the 555 timer IC2, initiating its timing cycle. The voltage at point 5, which is the output of 555 timer IC2, rises to the positive direct current power supply voltage, turning transistor Q1 on. Resistor R1 limits the current supplied to the base Q1a of transistor Q1. Capacitor C9, previously charged to the positive direct current supply voltage through resistor R1, then discharges through the coil of solenoid SOL1 and the collector Q1b and emitter Q1c of transistor Q1. The resulting current activates the 6 V DC solenoid SOL 1, mechanically activating the external, mechanical load i.e. the camera shutter. The solenoid SOL1 will deactivate when the capacitor C9 can no longer provide sufficient operating current. Diode D3 protects transistor Q1 from possibly damaging inductive voltages. A short time later, timer IC2 finishes its timing period and the voltage at point 5 returns to zero volts. This turns transistor Q1 off, and allows capacitor C9 to charge up again.

The direct current power for the operation of the circuit is provided by a 6 V battery BATT1. The negative terminal of the battery is connected to circuit ground. The positive terminal is connected to the positive direct current supply rail, through the switch SW3. Switch SW3 provides a means of removing battery power from the circuit when the circuit is not in use.

It will, of course, be appreciated that while specific components and values have been shown in FIG. 2, for purposes of illustration, variations therefrom will be readily apparent to those skilled in the art without departing from the scope of the present invention as defined in the claims appended hereto.

We claim:

1. A delay timer circuit comprising:
   an externally controlled switch means;
   first integrated circuit timer means arranged to provide a first output signal at the end of a selected first delay period initiated by said externally controlled switch means;
   variable resistor-capacitor means for selecting duration of said first delay period;
   circuit means for connecting said first integrated circuit timer means, through said externally controlled switch means, to a DC power source;
   second integrated circuit timer means arranged to provide a second output signal for a predetermined time period initiated by said first output signal;
   transistor means activated by said second output signal;
   solenoid means arranged to mechanically activate an external load when a current is passed therethrough; and
   capacitor means arranged to discharge a current through said solenoid means and said transistor means when said transistor means is activated, and to charge when said transistor means is deactivated.

2. A delay timer circuit as claimed in claim 1 including mode selecting means operatively connected to said externally controlled switch means.

3. A delay timer circuit as claimed in claim 2 wherein said first delay period is initiated when said externally controlled switch means is opened following a closure thereof.

4. A delay timer circuit as claimed in claim 2 wherein said first delay period is initiated when said externally controlled switch means is initially closed.

5. A camera-electronic delay timer combination comprising:
- a camera having shutter means;
- switch means for triggering said shutter means, remote from said camera;
- first integrated circuit timer means arranged to provide a first output signal at the end of a selected first delay period initiated by operation of said switch means;
- variable resistor-capacitor means for selecting duration of said first delay period;
- circuit means for connecting said first integrated circuit timer means, through said switch means, to a DC power source;
- second integrated circuit timer means arranged to provide a second output signal for a predetermined time period initiated by said first output signal;
- transistor means activated by said second output signal;
- solenoid means arranged to mechanically trigger said shutter means when a current is passed therethrough; and
- capacitor means arranged to discharge a current through said solenoid means and said transistor means when said transistor means is activated and to charge when said transistor means is deactivated.

6. The combination of claim 5 including mode selecting means operatively connected to said switch means.

7. The combination of claim 6 wherein said first delay period is initiated when said switch means is opened following a closure thereof.

8. The combination of claim 6 wherein said first delay period is initiated when said switch means is initially closed.

9. The combination of claim 5 wherein said remote switch means is contained in a floor mat.

* * * * *